(12) United States Patent
Weidmer (10) Patent No.: US 7,806,635 B2
(45) Date of Patent: Oct. 5, 2010

(54) METHOD AND APPARATUS FOR PRODUCING A SHAPED BORE

(75) Inventor: Stan C. Weidmer, Cincinnati, OH (US)

(73) Assignee: Makino, Inc., Mason, OH (US)

( * ) Notice: Subject to any disclaimer, the term of this patent is extended or adjusted under 35 U.S.C. 154(b) by 812 days.

(21) Appl. No.: 11/683,191

(22) Filed: Mar. 7, 2007

(65) Prior Publication Data

US 2008/0219787 A1    Sep. 11, 2008

(51) Int. Cl.
    *B23B 29/034*    (2006.01)
(52) U.S. Cl. .......................... 408/1 R; 408/59; 408/156; 408/714; 82/1.5
(58) Field of Classification Search ................. 408/1 R, 408/57, 59, 154, 156, 147, 180, 714, 157; 82/1.2–1.5
    See application file for complete search history.

(56) References Cited

U.S. PATENT DOCUMENTS

| 625,726 | A | 5/1899 | Halifax |
|---|---|---|---|
| 1,017,569 | A | 2/1912 | Lewis, Sr. |
| 1,594,114 | A | 7/1926 | Prout |
| 1,597,212 | A | 8/1926 | Spengler |
| 1,847,794 | A | 3/1932 | Takeda |
| 2,085,976 | A | 7/1937 | Heintz |
| 2,364,434 | A | 10/1944 | Surtees |
| 2,414,931 | A | 1/1947 | Colwell et al. |
| 2,575,938 | A | 11/1951 | Brenneke |
| 2,600,800 | A | 6/1952 | Pace et al. |
| 2,618,182 | A | 11/1952 | Tector |
| 2,825,250 | A | 3/1958 | Anthony et al. |
| 2,941,785 | A | 6/1960 | Kammerer |
| 3,063,763 | A | 11/1962 | Zubrisky |
| 3,089,362 | A | 5/1963 | Hill |
| 3,126,065 | A | 3/1964 | Chadderdon |

(Continued)

FOREIGN PATENT DOCUMENTS

DE    3408352    3/1984

(Continued)

OTHER PUBLICATIONS

Written Opinion, dated Jul. 22, 2005 for PCT Application No. PCT/US2005/006985.

(Continued)

*Primary Examiner*—Daniel W Howell
(74) *Attorney, Agent, or Firm*—Frost Brown Todd LLC (57) ABSTRACT

A tool for working a workpiece comprises an elongate member and a cam member. The elongate member comprises at least two extremities comprising at least one blade member. The at least two extremities are operable to separate in response to a pressurized medium. A conduit is in fluid communication with the extremities, and a pair of vents are in fluid communication with the conduit. The vents are operable to expel fluid communicated through the conduit. The cam member comprises an inner surface defining an opening. The inner surface of the cam resists expulsion of fluid from the vents, such that the cam and vents are operable to vary the pressure of fluid communicated through the conduit. The pressure variation varies the separation of the extremities as the elongate member is advanced through the cam toward a workpiece. The tool may be used to create bores having a non-cylindrical profile.

18 Claims, 9 Drawing Sheets

U.S. PATENT DOCUMENTS

| | | | |
|---|---|---|---|
| 3,133,344 A | 5/1964 | Keasler | |
| 3,343,390 A | 9/1967 | Spencer | |
| 3,389,621 A | 6/1968 | Wear | |
| 3,587,272 A | 6/1971 | Zmuda | |
| 3,622,247 A | 11/1971 | Greenberg et al. | |
| 3,688,537 A | 9/1972 | Schneider | |
| 3,735,615 A | 5/1973 | Shneider | |
| 3,749,187 A | 7/1973 | Leathers | |
| 3,795,160 A * | 3/1974 | Janiszewski | 82/1.4 |
| 3,808,955 A | 5/1974 | Hamada et al. | |
| 3,824,827 A | 7/1974 | Stockbridge et al. | |
| 3,827,269 A | 8/1974 | Hoagland et al. | |
| 3,888,146 A | 6/1975 | Tomenceak | |
| 3,961,104 A | 6/1976 | Tanner | |
| 4,066,380 A | 1/1978 | Beck et al. | |
| 4,178,725 A | 12/1979 | Goloff | |
| 4,224,846 A | 9/1980 | Eysel et al. | |
| 4,289,431 A | 9/1981 | Berstein | |
| 4,443,140 A | 4/1984 | Boetto | |
| 4,569,115 A | 2/1986 | Unno et al. | |
| 4,602,539 A | 7/1986 | Tsukiji | |
| 4,648,295 A | 3/1987 | Ley et al. | |
| 4,651,599 A | 3/1987 | Ley | |
| 4,706,417 A | 11/1987 | Gary | |
| 4,706,483 A | 11/1987 | Perraudin | |
| 4,785,648 A | 11/1988 | Budrean et al. | |
| 4,817,725 A | 4/1989 | Jenkins | |
| 4,941,782 A | 7/1990 | Cook | |
| 5,139,098 A | 8/1992 | Blake | |
| 5,287,621 A | 2/1994 | Usui | |
| 5,304,019 A | 4/1994 | Klee et al. | |
| 5,325,695 A | 7/1994 | Seo et al. | |
| 5,331,775 A | 7/1994 | Carmichael et al. | |
| 5,368,420 A | 11/1994 | Gerk et al. | |
| 5,427,480 A | 6/1995 | Stephens | |
| 5,441,439 A | 8/1995 | Grimm et al. | |
| 5,540,526 A | 7/1996 | Hyatt et al. | |
| 5,630,953 A | 5/1997 | Klink | |
| 5,655,955 A | 8/1997 | Nagel et al. | |
| 5,730,036 A | 3/1998 | Ozaki et al. | |
| 5,775,853 A | 7/1998 | Keefer et al. | |
| 5,782,585 A | 7/1998 | Bathen | |
| 5,791,409 A | 8/1998 | Flanders | |
| 5,800,252 A | 9/1998 | Hyatt | |
| 5,862,700 A | 1/1999 | Klein | |
| 5,865,573 A | 2/1999 | Kress | |
| 5,916,317 A | 6/1999 | Willoughby et al. | |
| 5,931,038 A | 8/1999 | Higashi | |
| 5,975,987 A | 11/1999 | Hoopman et al. | |
| 6,227,082 B1 | 5/2001 | Hormansdorfer et al. | |
| 6,238,150 B1 | 5/2001 | Yamada et al. | |
| 6,253,724 B1 | 7/2001 | Han | |
| 6,270,295 B1 | 8/2001 | Hyatt et al. | |
| 6,295,854 B1 | 10/2001 | Stein et al. | |
| 6,315,503 B1 | 11/2001 | Oswald et al. | |
| 6,378,632 B1 | 4/2002 | Dewey et al. | |
| 6,470,724 B1 | 10/2002 | Friese | |
| 6,503,031 B1 | 1/2003 | Chaet et al. | |
| 6,527,623 B1 | 3/2003 | Bowers | |
| 6,536,998 B2 | 3/2003 | Hyatt et al. | |
| 6,585,571 B2 | 7/2003 | Hyatt et al. | |
| 6,705,184 B2 * | 3/2004 | Cardemon et al. | 82/1.11 |
| 6,729,810 B2 | 5/2004 | Hyatt et al. | |
| 6,779,953 B2 | 8/2004 | Suzuki et al. | |
| 6,926,475 B2 | 8/2005 | Kress et al. | |
| 7,090,445 B2 | 8/2006 | Woodruff et al. | |
| 7,140,819 B2 | 11/2006 | Broghammer et al. | |
| 7,384,219 B2 | 6/2008 | Weidmer | |
| 2003/0177804 A1 | 9/2003 | Luthy | |
| 2005/0145417 A1 | 7/2005 | Radford et al. | |
| 2005/0217336 A1 | 10/2005 | Weidmer | |
| 2006/0159530 A1 | 7/2006 | Woodruff et al. | |

FOREIGN PATENT DOCUMENTS

| | | |
|---|---|---|
| DE | 3408325 | 12/1984 |
| DE | 3408352 | 9/1985 |
| DE | 4124538 | 7/1991 |
| DE | 4124538 | 10/1992 |
| EP | 1405689 | 4/2004 |
| GB | 878281 | 9/1961 |
| WO | WO 2004/0022271 | 3/2004 |

OTHER PUBLICATIONS

EPC Invitation to Correct for EP Application 03-759-219.3-3202, dated Mar. 29, 2006.
EPO Examination Report dated Mar. 29, 2006 for EP Application No. 03-759-219.3-3202.
Search Report dated Jul. 30, 2008 for Application No. PCT/US2008/055591.
Written Opinion Opinion dated Jul. 30, 2008 for Application No. PCT/US2008/055591.

* cited by examiner

METHOD AND APPARATUS FOR PRODUCING A SHAPED BORE

BACKGROUND

A variety of tools and systems have been made and used to create bores having a variety of geometries. Exemplary tools and systems are disclosed in U.S. Pat. No. 7,090,445, issued Aug. 15, 2006 to Makino, Inc; U.S. Pat. No. 6,270,295, issued Aug. 7, 2001 to Makino, Inc.; and U.S. Non-Provisional patent application Ser. No. 10/654,328, filed Sep. 3, 2003 by Weidmer. Each of the foregoing patents and patent application is incorporated by reference herein. Some boring situations may call for a bore geometry that is generally cylindrical, while other boring situations may call for a bore geometry that is tapered or otherwise non-cylindrical. While a variety of systems and methods have been used for producing bores, it is believed that no one prior to the inventor has made or used the invention described in the appended claims.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

Reference will now be made in detail to various embodiments of the invention, examples of which are illustrated in the accompanying drawings.

DETAILED DESCRIPTION OF EMBODIMENTS OF THE INVENTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
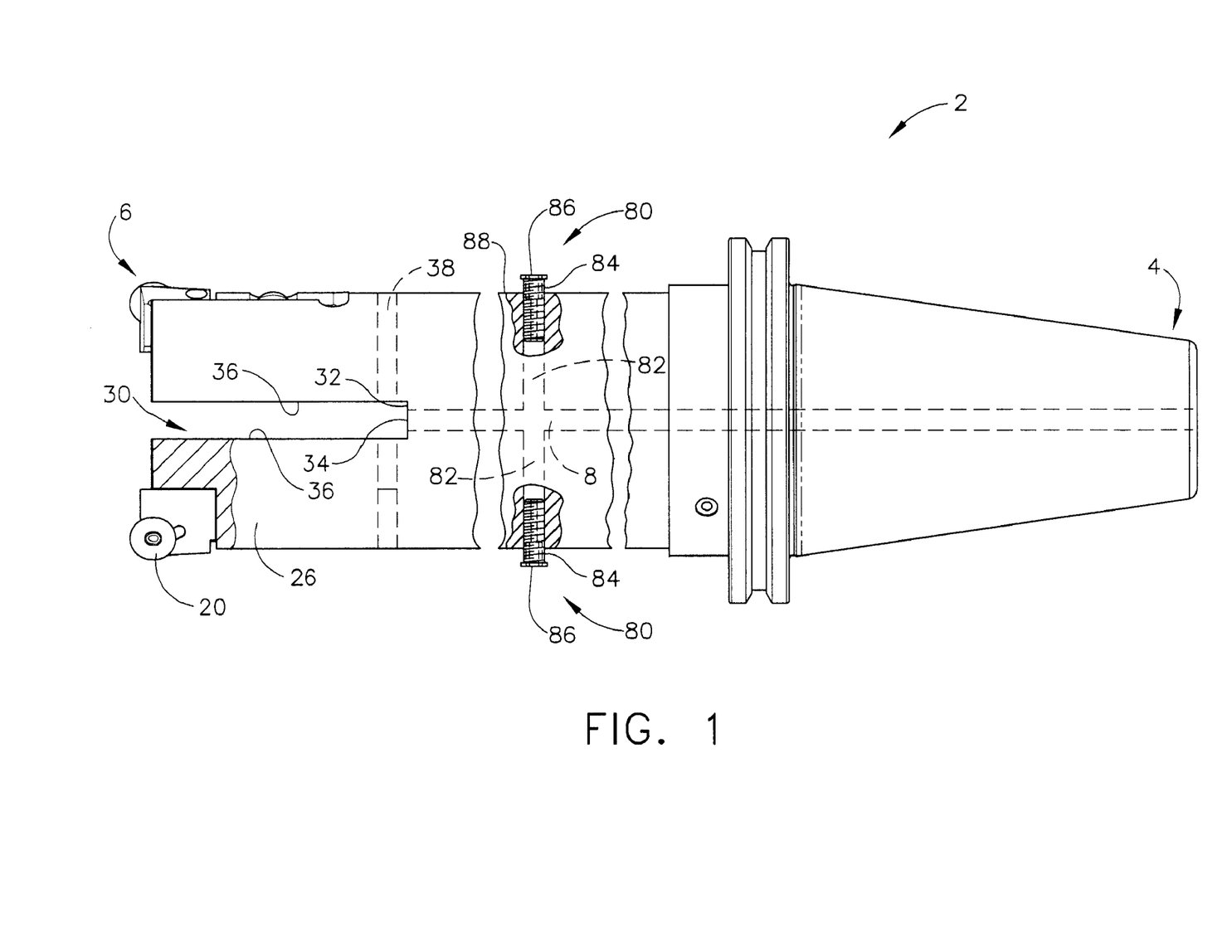
FIG. 1 is a partial cross-sectional side view of a tool constructed in accordance with an exemplary embodiment of the present invention.
Figure 2:
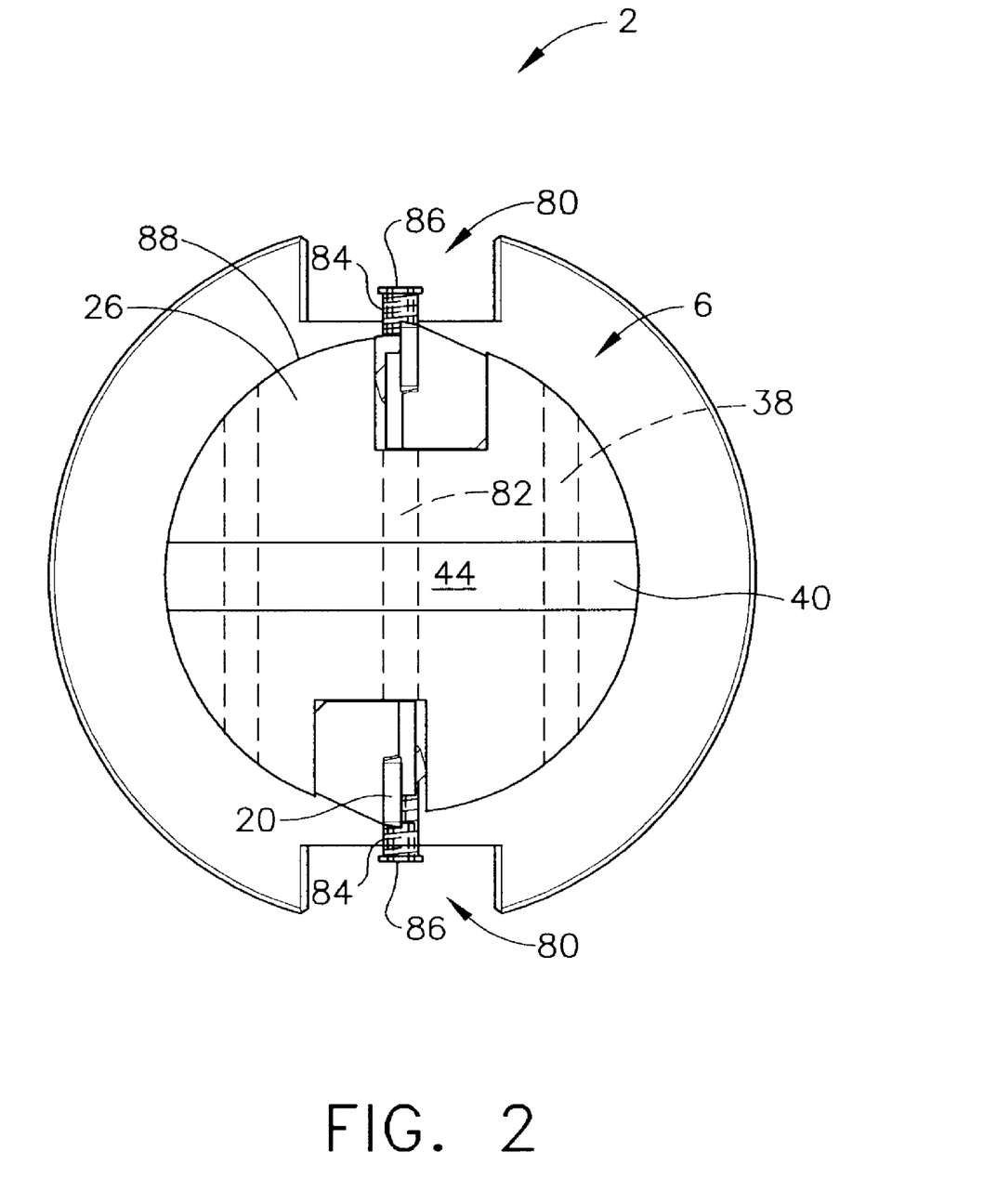
FIG. 2 is an end view of the tool of FIG. 1.

Referring now to the drawings in detail, wherein like numerals indicate the same elements throughout the views, FIGS. 1 and 2 show tool (2) having proximal end (4) and distal end (6). Conduit (8) runs along the axis of tool (2) from proximal end (4) toward distal end (6). As used herein, the term "conduit" is intended to include any channel or other structure or configuration through which fluid (e.g., liquid, etc.), materials, and the like may be conveyed, passed, or otherwise communicated. In the present example, conduit (8) is configured to permit communication of a fluid medium through tool (2). However, those of ordinary skill in the art will appreciate that other suitable configurations may be used to permit fluid communication.

In the present example, tool (2) is adapted for use with a machining station (not shown) having a selectively rotatable machine spindle, and that may quickly and easily receive and secure one of a plurality of tools for various operations (e.g., rotating, vibrating, oscillating, etc.). A machining station may have a synchronized system, such as an automatic tool changer for quickly and easily interchanging and utilizing multiple machining tools at one machining station, thereby allowing the machining station to provide greater utility or range of operations. Tool (2) is further configured for use with a source of a pressurized fluid medium for communication to conduit (8) in tool (2). The machining station permits a user to selectively control both the speed of tool (2) rotation and the pressure of the fluid medium being communicated to conduit (8). In one embodiment, the fluid medium is capable of providing lubrication and/or cooling of at least a portion of the interface between tool (2) and a workpiece (not shown).

In the present example, tool (2) is attachable to a selectively rotatable spindle at proximal end (4), and receives a pressurized fluid medium at proximal end (4). In this way, the interface of machining station and proximal end (4) of tool (2) of the present example is quite similar to the corresponding interface described in U.S. Pat. No. 6,270,295.

Figure 3:
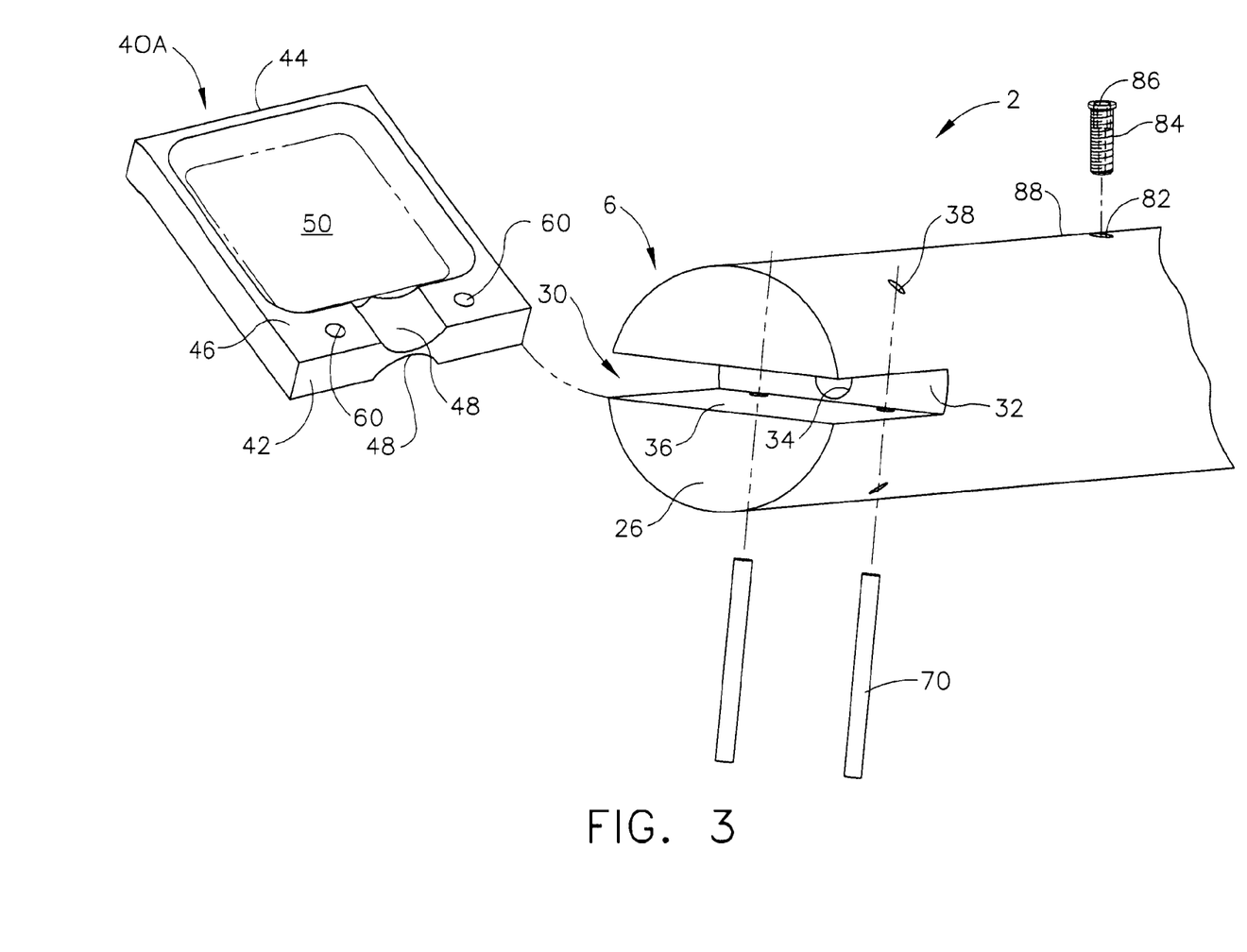
FIG. 3 is an exploded perspective view of the tool of FIG. 1.

Distal end (6) of tool (2) includes a pair of opposing cutting blades (20) mounted on extremities (26). FIG. 1 includes a partial cross section of extremity (26) to show cutting blade (20). A slot (30) is defined between pair of extremities (26), and has a plate (40A) (not shown in FIG. 1) disposed therein. As shown in FIG. 3, which omits several elements of tool (2) for simplicity, dowel pins (70) may be used to hold plate (40A) within slot (30). Other suitable distal end (6) features and configurations will be apparent to those of ordinary skill in the art, including but not limited to inserted members other than plate (40A) and alternatives for dowel pins (70).

Slot (30) is generally rectangular, and is defined by proximal surface (32) and two side surfaces (36). Proximal surface (32) has opening (34) along the axis of tool (2) for fluid communication with conduit (8). Each side surface (36) has a pair of pin openings (38). Each pin opening (38) extends completely through corresponding extremity (26) in a direction transverse the axis of tool (2), and is configured to receive dowel pin (70). Other suitable slot (30) configurations will be apparent to those of ordinary skill in the art.

By way of example only, distal end (6) of tool (2) may have a diameter of approximately 8 inches, 2 inches, 1.25 inches, 1 inch, or 32 mm. Slot (30) may have a width (e.g., distance between side surfaces (36)) of approximately 0.375 inches or 5 mm. Of course, any other suitable dimensions may be used for tool (2) diameter and/or slot (30) width. Slot (30) may be 2.6 inches deep (e.g., distance from distal end of tool (6) to proximal surface (32) of slot (30) is 2.6 inches), 3.321 inches deep, or any other suitable depth.

Figure 4:
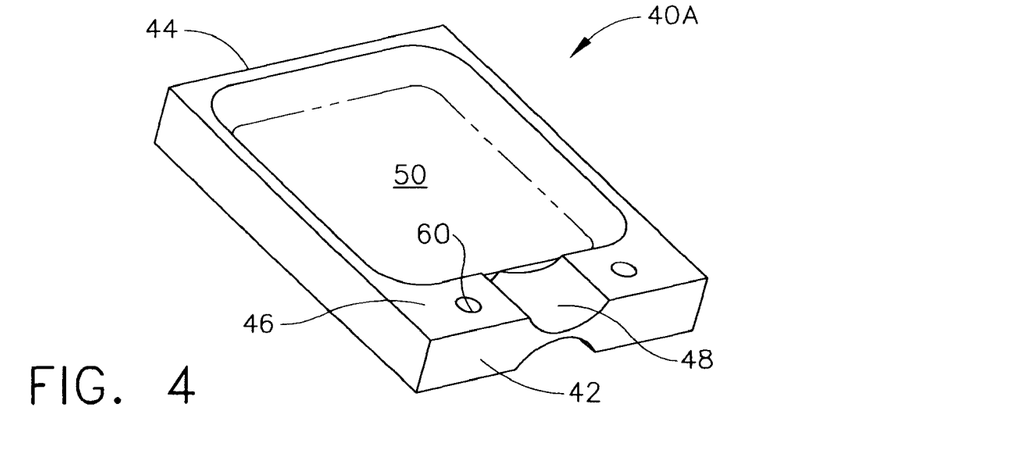
FIG. 4 is a perspective view of an embodiment of a plate for the tool of FIG. 1.

Plate (40A) has proximal end (42), distal end (44), and a pair of side surfaces (46). Plate (40A) also has a pair of pin openings (60) formed through side surfaces (46), each opening (60) being configured to receive dowel pin (70). Plate (40A) is configured to fit in slot (30), such as by an interference fit. Such an interference fit may be obtained where plate (40A) has a thickness that is 0.001" greater than the width of slot (30), by way of example only. In one embodiment, slot (30) has a width of 0.374" while plate (40A) has thickness of 0.375". Other suitable relative dimensions of slot (30) and plate (40A) for producing any type or degree of interference fit will be apparent to those of ordinary skill in the art. Alternatively, slot (30) and plate (40A) may be dimensioned such that the fit is not an interference fit. By way of example only, slot may have a width of 0.375" while plate (40A) has a thickness of 0.374". In addition, plate (40A) may be dimensioned such that its exposed outer surfaces are flush with or slightly recessed from the outer surfaces of tool (2).

Tool (2) of the present example further comprises a pair of vents (80). Of course, any other number of vents (80) may be used. Vents (80) are longitudinally positioned proximal to slot (30) in this example. Each vent (80) comprises a vent conduit (82) in fluid communication with conduit (8). Each vent conduit (82) is substantially perpendicular to conduit (8) in this example, and opens at the outer side surface (88) of tool (2). Each vent conduit (82) is also oriented at an angular position about the axis of tool (2) that corresponds to the angular position of cutting blades (20) about the axis of tool (2). Alternatively, vent conduits (82) may have any other suitable orientation relative to conduit (8), cutting blades (20), and/or axis of tool (2). A cannulated set screw (84) is provided within each vent conduit (82). Each cannulated set screw (84) has an orifice (86) formed therethrough, and each orifice (86) is in fluid communication with its corresponding vent conduit (82). Each cannulated set screw (84) in the present example is positioned within its corresponding vent conduit (82) such that a portion of each set screw (84) extends radially outward beyond outer side surface (88) of tool (2). Of course, cannulated set screws (84) may have any other suitable relationship with outer side surface (88) of tool (2). As will be described in greater detail below, vents (80) are configured to selectively provide pressure relief for fluid communicated through conduit (8).

FIG. 3 shows plate (40A), a simplified rendering of tool (2), and dowel pins (70) prior to insertion of plate (40A) in slot (30). In the present example, with plate (40A) properly positioned within slot (30), pin openings (38) of slot (30) align with pin openings (60) of plate (40A), such that dowel pins (70) may be placed through pin openings (38, 60) to secure plate (40A) within slot (30). Alternatively, any other suitable configuration for securing plate (40A) within slot (30) may be used.

In the present example, each side surface (46) of plate (40A) has a recess (50) formed therein. Each recess (50) has a channel (48), also formed in respective side surface (46), leading to proximal end (42). Each channel (48) is configured to permit fluid communication to corresponding recess (50). In the present example, with plate (40A) properly positioned within slot (30), each channel (48) will be in fluid communication with opening (34) in proximal surface (32) of slot (30), such that fluid may be communicated through conduit (8), through opening (34), and through channel (48) to reach each recess (50) in plate (40A). Alternatively, any other suitable configuration may be used to facilitate communication of a fluid medium to each recess (50).

Figure 5:
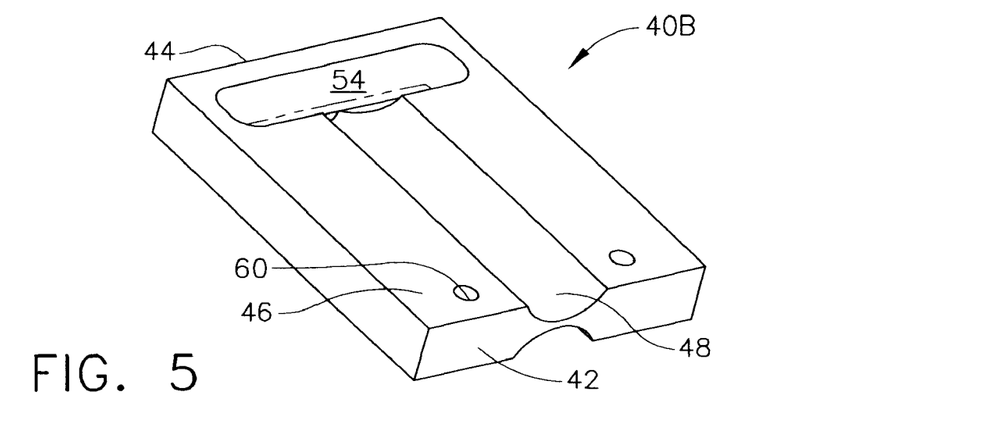
FIG. 5 is a perspective view of an alternate embodiment of a plate for the tool of FIG. 1.
Figure 6:
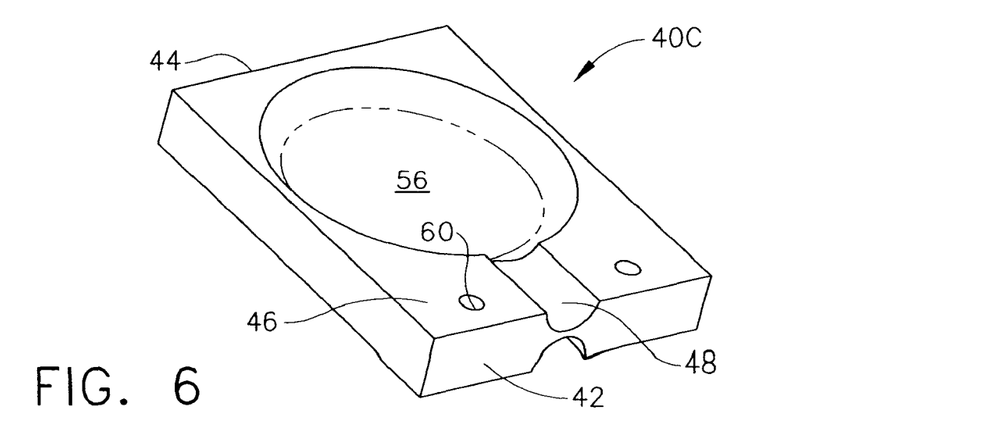
FIG. 6 is a perspective view of an alternate embodiment of a plate for the tool of FIG. 1.

It will be appreciated that plate (40A) may be modular in nature, such that a variety of types of plates (40A) may be inserted in slot (30). An aspect of plate (40A) that may be modified for such varying plate (40A) types may be the configuration of recesses (50). As shown in FIGS. 3 and 4, recesses (50) may be generally rectangular in shape. Alternatively, as shown in FIG. 5, recesses (54) in plate (40B) may be generally "T"-shaped. In yet another embodiment, shown in FIG. 6, recesses (56) in plate (40C) are generally circular. Plate (40A) configurations may also be varied as a function of recess (50) size, in addition to, or instead of, recess (50) shape. In one embodiment, recesses (50) in respective side surfaces (46) of plate (40A) have substantially the same size and shape. Alternatively, recesses (50) on plate (40A) may be sized and/or shaped differently. Still other suitable recess (50) configurations and variations will be apparent to those of ordinary skill in the art.

Plate (40A) may be made of any suitable material or materials. By way of example only, plate (40A) may be made of steel, aluminum, plastic, or any other suitable material, including combinations thereof.

Figure 7:
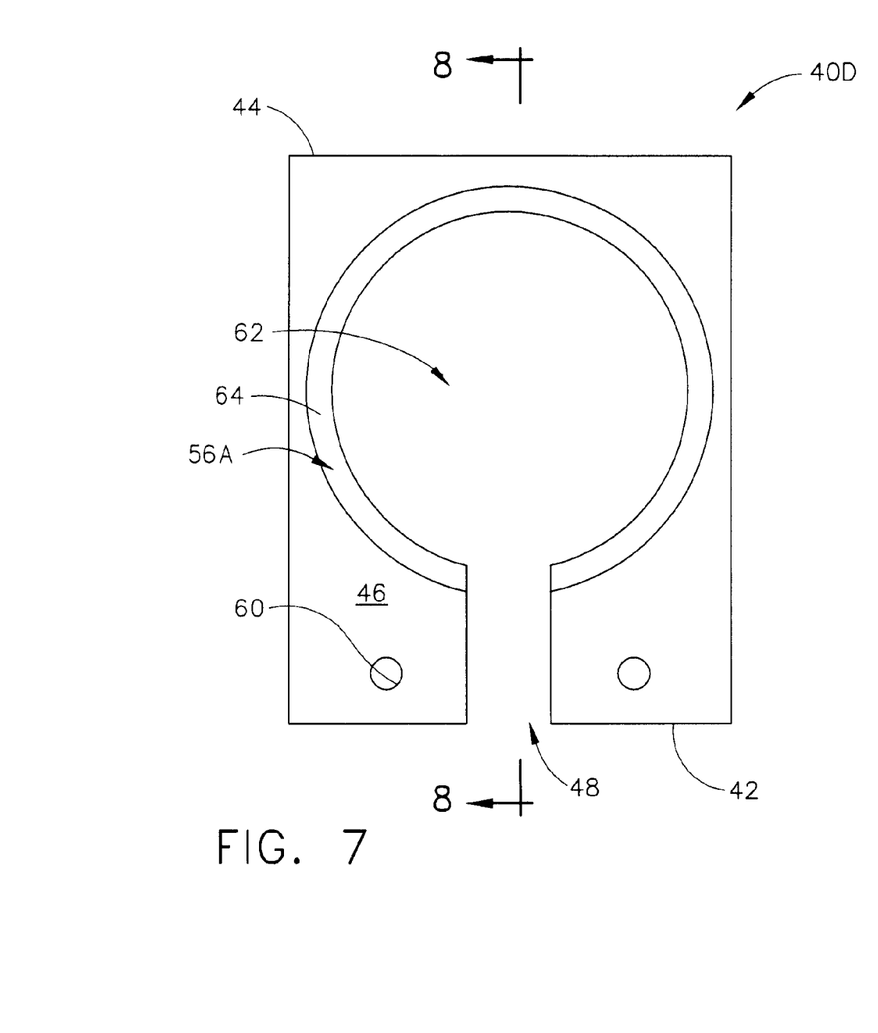
FIG. 7 is a front elevational view of an alternate embodiment of a plate for the tool of FIG. 1, configured to receive a wafer.
Figure 8:
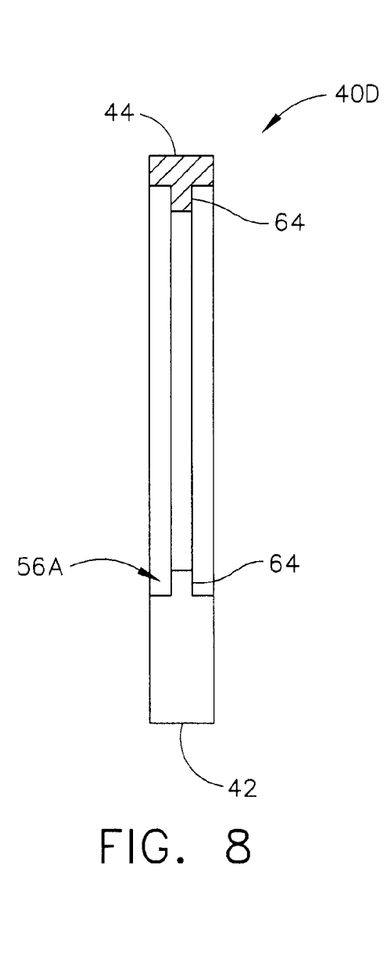
FIG. 8 is a cross-sectional side view of the plate of FIG. 7, taken along line 8-8.
Figure 9:
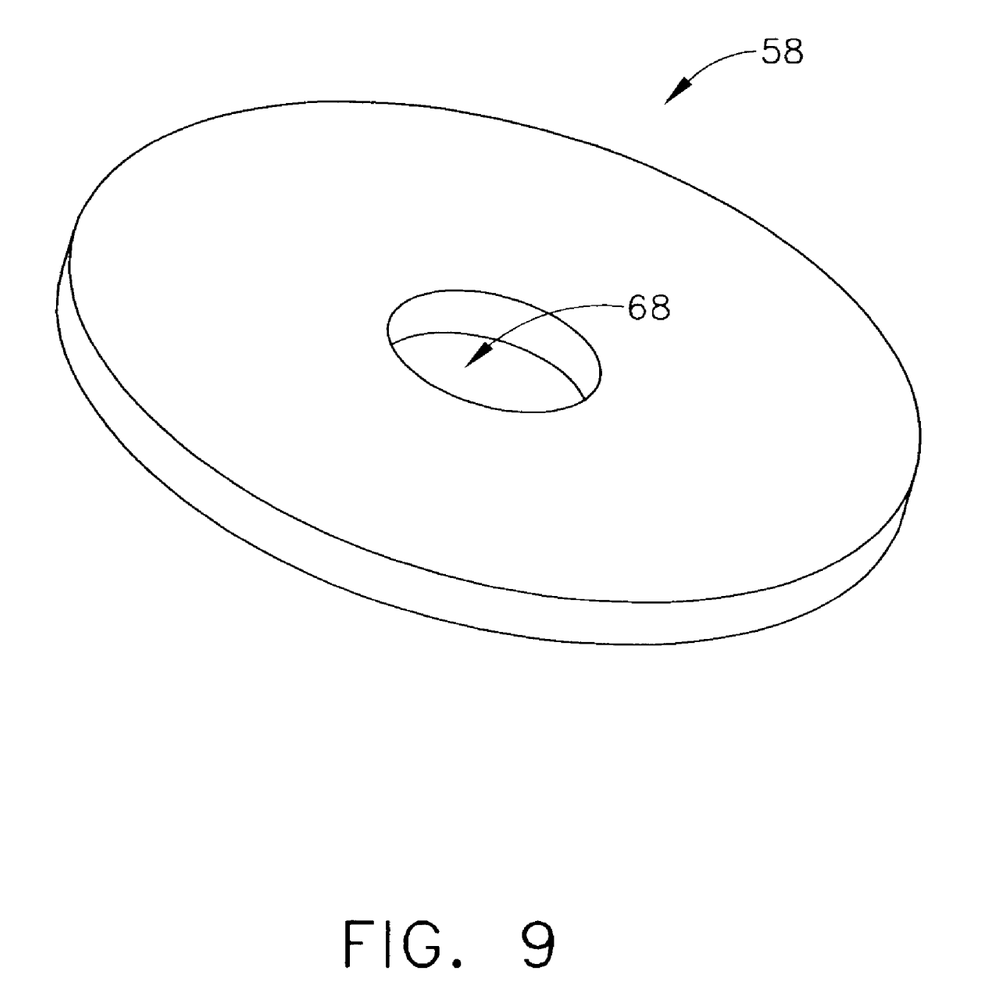
FIG. 9 is a perspective view of an embodiment of a wafer configured to fit in the plate of FIG. 7.

In an alternate embodiment, shown in FIGS. 7-9, plate (40D) is configured to receive a wafer (58). In this embodiment, plate (40D) has center opening (62) formed therethrough. Opening (62) is in fluid communication with channel (48) in proximal end (42) of plate (40D). Opening (62) is defined by inner annular ridge (64), which is recessed within plate (40D) to provide recess (56A).

An exemplary removable wafer (58) is shown in FIG. 9. Wafer (58) may be positioned within recess (56A), adjacent annular ridge (64). As shown, the shape of wafer (58) corresponds to the shape of recess (56A). While wafer (58) is shown as generally circular to correspond with generally circular recess (56A), it will be appreciated that wafer (58) may correspond to any other shape. By way of example only, wafer (58) may be generally square to correspond with generally square recess (50), generally "T"-shaped to correspond with generally "T"-shaped recess (54), or any other shape to correspond with a different recess. Alternatively, wafer (58) may be shaped differently than recess (50) in which it is disposed, such that they do not correspond.

It will also be appreciated that wafer (58) may be used with any of plates (40A-40C) that lacks opening (62). In other words, wafer (58) may be provided within a recess (50, 54, 56). In such an embodiment, wafer (58) may include a channel or conduit to facilitate entry of fluid into space between wafer (58) and recess (50), or into space adjacent to wafer (58). Alternatively, any of plates (40A-40C) may include an opening in addition to or as an alternative to recesses (50, 54, 56). Other combinations and variations will be apparent to those of ordinary skill in the art.

In one embodiment, annular ridge (64) is recessed 0.125" within plate (40D) (e.g., the distance between annular ridge (64) and side surface (46) is 0.125"), while wafer (58) has a thickness of 0.1127". Recess (56A) has a diameter of 2.4", while wafer (58) has a diameter of 2.35". Alternatively, recess (56A) and wafer (58) are sized such that there is an interference fit between wafer (58) and plate (40D). Still other suitable dimensions for plate (40D) and/or wafer (58) will be apparent to those of ordinary skill in the art.

During use of plate (40D) having wafer (58) inserted in recess (56A), pressurized fluid communicated to and through channel (48) reaches opening (62), where it exerts an outward force on wafer (58). Wafer (58), in turn, exerts outward force on extremity (26) of tool (2). Thus, rather than having fluid exert force on extremity (26) directly, fluid exerts force on extremity (26) via wafer (58) in this example.

Wafer (58) configuration may be varied by size, shape, and/or by having one or more openings (68) formed in wafer (58). Such an opening (68) may permit some fluid to escape therethrough. Such escaping fluid may exert some force directly on extremity (26). By way of example only, wafer (58) with an opening (68) formed in its center may provide characteristics that differ from a wafer that has no opening. Similarly, one wafer (58) that has an opening (68) of a first size may provide characteristics that differ from wafer (58) that has opening (68) of a different, second size.

In one embodiment, wafer (58) has opening (68) with a diameter of 0.475". Of course, the number and/or size of opening(s) (68) may vary greatly. It will be appreciated that the size, shape, and/or number of openings (68) in wafer (58) may relate to the force exerted by wafer (58) on extremity (26). In addition, the size and/or number of openings (68) in wafer (58) may relate to the amount of fluid permitted to leak from tool (2). Other embodiments and uses for opening(s) (68) in wafer (58) will be apparent to those of ordinary skill in the art.

Wafer (58) may be made of any suitable material or materials. By way of example only, wafer (58) may be made of polyurethane, brass, or any other suitable material, including combinations thereof. In one embodiment, the material of which wafer (58) is made is softer or less dense than the material of which plate (40D) is made. Alternatively, the respective materials may be of any other suitable relative hardness.

Of course, wafer (58) may be eliminated altogether. As will be apparent from the foregoing examples, the term "wafer" shall be broadly construed to include any member that may be inserted in or otherwise engaged with recess (50, 54, 56, 56A) of plate (40A-40D).

Those of ordinary skill in the art will also appreciate the various tool (2) properties that may be varied by using plates (40D) having different recess (50) and/or wafer (58) configurations or properties. By way of example only, the fluid pressure required to cause outward bending of extremities (26) may vary depending on recess (50) configuration. In addition, or in the alternative, the rate at which the diametric distance between cutting blades (20) varies with fluid pressure may be a function of recess (50) and/or wafer (58) configuration. Still other effects of varying plate (40D), recess (50, 52, 54, 56, 56A), and/or wafer (58) configuration will be apparent to those of ordinary skill in the art.

During use, such as when tool (2) is being used to cut a bore having a high length-to-diameter ratio in a workpiece by way of example only, a user may selectively adjust the pressure of fluid being communicated to tool (2). Of course, the same may be true for cutting other bores. Those of ordinary skill in the art will recognize that such pressure adjustments of communicated fluid may also adjust the pressure of fluid within tool (2). As the fluid pressure is increased in the present example, the fluid will be directed outward by recesses (50) in side surfaces (46) of plate (40A), thereby exerting an increasing, outward force against side surfaces (36) of slot (30) (e.g., outward force increases with fluid pressure). When the fluid pressure reaches a sufficient level, this force will cause extremities (26) to bend radially outward (e.g., side surfaces (36) of slot will be deflected outward by the fluid), thereby urging cutting blades (20) radially outward. This will increase the effective diameter of distal end (6) of tool (2). By way of example only, such diametric expansion may be achieved with fluid pressures ranging from approximately 200 psi to 800 psi. Of course, other fluid pressure amounts may cause expansion based on a variety of factors (e.g., tool material, fluid density, thickness of extremities, etc.).

Accordingly, extremities (26) and slot (30) may constitute a selective bias portion of tool (2). In other words, extremities (26) and slot (30) of the present example are configured to selectively bias cutting blades (20) to a variety of use positions. Of course, a selective bias portion of tool (2) may include other elements or features.

In the present example, the radial positioning of cutting blades (20) with respect to the axis of tool (2) may be adjusted according to the pressure of the fluid being communicated to and through tool (2), such that increasing fluid pressure will increase the diametric distance between cutting blades (20). Accordingly, tool (2) may be used to cut or ream bores of different diameters, as the diametric distance between cutting blades (20) may be varied as a function of fluid pressure. In one embodiment, when fluid pressure is decreased, the resilience of the material of which tool (2) is made causes extremities (26) to return back (e.g. radially inward) to their prior configuration. Such resilience may be found where tool (2) is made of steel or any other metal, alloy, or the like. Other suitable materials for making tool (2) will be apparent to those of ordinary skill in the art. In addition, other ways in which extremities (26) may be caused to return back to a prior configuration will be apparent to those of ordinary skill in the art (e.g., inducing a vacuum condition in conduit (8), magnetically or mechanically pulling extremities (26) together, etc.).

As noted above, the diametric distance between cutting blades (20) may be varied as a function of fluid pressure, and the fluid pressure may be varied by varying the pressure of fluid being communicated to conduit (8). For instance, the source of pressurized fluid may have a valve or other feature operable to vary the pressure of fluid being communicated to conduit (8). Alternatively, fluid pressure within tool (2) may be varied even where the pressure of fluid being communicated to conduit (8) (e.g., from the pressurized fluid source) is kept substantially constant. In other words, pressure variations may be selectively and controllably created within tool (2) itself, such that the pressure of fluid within one portion of conduit (8) may differ from the pressure of fluid within another portion of conduit (8). Such controllable pressure variations may be induced using vents (80) and a hydraulic cam (90), an example of which is shown in FIG. 10.

Figure 10:
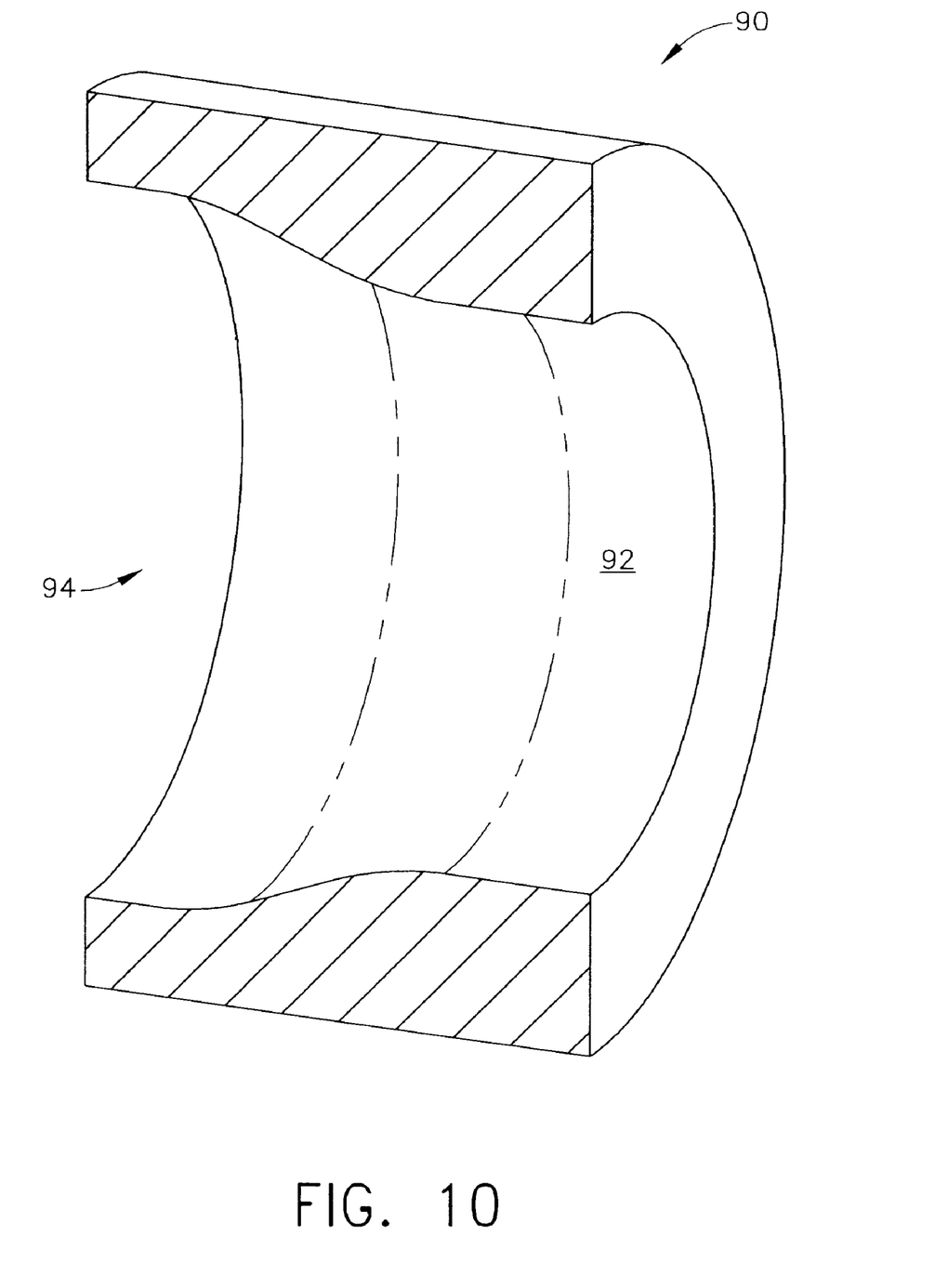
FIG. 10 is a perspective cross-sectional view of an exemplary hydraulic cam.

As shown in FIG. 10, hydraulic cam (90) of the present example is generally cylindraceous, and has an interior surface (92) defining an axial opening (94) through the center of cam (90). It will be appreciated, however, that cam (90) need not be generally cylindraceous, and may have any other suitable configuration. As shown in FIGS. 11A-11F, cam (90) is configured such that at least a portion of tool (2) is fed through opening (94) before and during operation of tool (2). In particular, the narrowest inner diameter of axial opening (94) is greater than the distance between the outermost edges of cutting blades (20) when cutting blades (20) are at rest (e.g., when extremities (26) are not being forced apart by fluid pressure). Such relative configuration of opening (94) and cutting blades (20) permits distal end (6) to be inserted through cam (90) without interference between cutting blades (20) and interior surface (92). Cam (90) may be secured within a machining station via a fixture (not shown), such that cam (90) is prevented from moving in the axial direction. For instance, cam (90) may further comprise a flange (not shown) or other feature that may be bolted to or be otherwise secured to a fixture. Other suitable ways for securing cam (90) will be apparent to those of ordinary skill in the art. It will also be appreciated that more than one cam (90) may be provided within a work station. Tool (2) may be moved (e.g., manually or automatically) from one cam (90) to another; or cams (90)

may be changed (e.g., manually or automatically) for use with a single tool (2) in a single location.

In the present example, cam (90) and tool (2) are positioned and operated such that interior surface (92) is configured to resist fluid expelled through vents (80). Such resistance may affect the pressure of fluid within conduit (8) downstream of vents (80). In particular, low resistance by cam (90) may effect greater drops in pressure of fluid within conduit (8) downstream of vents (80); as compared to lesser drops in pressure of fluid within conduit (8) downstream of vents (80) caused by high resistance by cam (90). In the present example, resistance by cam (90) is a function of the distance from vents (80) to interior surface (92) of cam (90).

As is also shown in FIGS. 10 and 11A-11F, interior surface (92) of cam (90) is non-cylindrical, and is curved along the axial length of cam (90). Such curvature will provide a distance between vents (80) and interior surface (92) that varies as tool (2) is fed axially through opening (94) of cam (90). In the present example, this varying distance of separation will translate into varying resistance by cam (90) of fluid expelled by vents (80), which will translate into varying fluid pressure in conduit (8) downstream of vents (80), which will in turn translate into varying separation of cutting blades (20). In other words, the curvature of interior surface (92) will provide a separation of cutting blades (20) that varies as a function of the axial position of tool (2) within opening (94) of cam (90).

Alternatively, interior surface (92) may have any other suitable configuration, including but not limited to cylindrical, tapered, hourglass-shaped, jagged, stepped, etc., and combinations thereof. It will also be appreciated that the geometry of interior surface (92) may be symmetric about the axis of opening (94) or may be non-axis-symmetric. In the present example, inner surface (92) is configured to correspond with the inner surface (104) of a bore (102) that is sought to be created and/or shaped by tool (2). For instance, and as will be described in greater detail below, the configuration of inner surface (92) may represent an inverse profile or an exaggerated inverse profile of the inner surface (104) of a bore (102) that is sought to be created and/or shaped by tool (2). Cam (90) may thus operate in a manner roughly similar to that of a pantograph device. As shown in FIGS. 11A-11F, where tool (2) is used to shape a bore (102) in a workpiece (100), the interior surface (102) of bore (102) will have a profile that is generally inverse to the profile of inner surface (92) of cam (90). As used herein, the term "generally inverse" shall be read to include relationships where the profile of inner surface (94) is a direct geometric inverse of the profile of interior surface (102), where the profile of inner surface (94) is an exaggerated geometric inverse of the profile of interior surface (102), where the profile of inner surface (94) is a proportional geometric inverse of the profile of interior surface (102), and other suitable inverse relationships. Alternatively, the configuration of inner surface (94) of cam (90) may have any other suitable relationship with the configuration of interior surface (102) of bore (102) that is sought to be produced or shaped.

It will be appreciated that resistance to expulsion of fluid through vents (80) may also be varied as a function of the diameter of orifice (86) in each cannulated set screw (86). A plurality of modular cannulated set screws (86) may be provided (e.g., in a kit) with varying orifice (86) diameters, and set screws (86) having an ideal orifice (86) diameter for a particular situation may be selected as appropriate. Conduits (82) in vents (80) may be configured to receive any of such modular cannulated set screws (86), such that cannulated set screws (86) may be replaced by unscrewing a cannulated set screw (86) with one orifice (86) diameter and screwing in a cannulated set screw (86) with a different orifice (86) diameter. Furthermore, resistance to expulsion of fluid through vents (80) may also be varied as a function of the distance to which cannulated set screws (86) extend beyond the outer side surface (88) of tool (2). Such distance may be varied by screwing or unscrewing cannulated set screws (86) relative to conduits (82) until the desired distance is obtained. To the extent that orifice (86) diameter selections and/or cannulated set screw (86) distance selections are/is used to vary resistance to expulsion of fluid through vents (80), such selections may be based at least in part on the particular configuration of a cam (90) inner surface (92) and/or based on other considerations. Similarly, a cam (90) inner surface (92) configuration may be selected based at least in part on orifice (86) diameter and/or cannulated set screw (86) distance. Other ways in which such variables may be chosen and/or interact will be apparent to those of ordinary skill in the art.

In the present example, edges of cannulated set screws (86) protruding from tool (2) (e.g., on the heads of such screws (86)) are rounded. Such rounding may reduce turbulence of fluid that may otherwise occur absent such rounding. Of course, such rounding is not necessary. In addition, cannulated set screws (86) of the present example protrude from tool (2) such that they provide an effective diameter for tool (2) that exceeds the effective diameter provided by cutting blades (20). In other words, the distance between the outermost points of cannulated set screws (86) is greater than the distance between the outermost points of cutting blades (20). However, the distance between the outermost points of cannulated set screws (86) may alternatively be less than or equal to the distance between the outermost points of cutting blades (20).

Cam (90) of the present example is created by a computer numerical control (CNC) assisted lathing process. For instance, a computer aided design (CAD) of the cam (90) geometry may be input into a CNC lathe control, and cam (90) may be lathed accordingly. The CAD of the cam (90) geometry may be established based on the geometry of the interior surface (104) of a bore (102) sought to be produced. As noted above, the cam (90) geometry may represent an inverse of the bore (102) geometry, or may be established using any other formula (e.g., some other formula incorporating geometric parameters of the bore (102) design). Of course, a cam (90) may be created using any other suitable process and based on any other factors.

It will be appreciated in view of the foregoing that the separation of cutting blades (20) may be varied as a function of the geometry of inner surface (92) of cam (90), which itself varies as a function of the axial position of tool (2) relative to cam (90). Accordingly, a bore (102) having a non-cylindrical interior surface (104) may be shaped or created with the pressure of the fluid being fed into tool (2) being kept at least substantially constant. In addition to or in lieu of using vents (80) and cam (90) to vary the pressure of fluid within tool (2), the pressure of fluid being fed into tool (2) may be varied (e.g., by controlling a valve or pump), but as noted above, such upstream pressure variation is not necessary in the present example.

In some situations, there may be a lag between the time that resistance by cam (90) to expulsion of fluid from vents (80) is varied and the time cutting blades (20) separate or retract in response to such resistance variation. Such a lag time may be a function of various factors, including but not limited to orifice (86) diameter, the distance between cannulated set screws (84) and interior surface (92) at a given moment, and/or the longitudinal distance of vents (80) relative to distal end (6) of tool (2). In some settings, such lag time may be negligible, while in others, it may be accounted for by appropriately varying parameters that influence the lag time. Tool (2) and/or cam (90) may therefore be constructed such that the lag time is accounted for, virtually eliminated, or tolerable.

It will also be appreciated that, in the present example, the pressurized fluid will tend to leak at distal end (6) of tool (2) during use of tool (2). This leakage will occur at distal end (6) between side surfaces (36) of slot (30) and side surfaces (46) of plate (40A). In other words, the outward bending of extremities (26) will tend to create gaps between side surfaces (36) of slot (30) and side surfaces (46) of plate (40A), and the pressurized fluid will leak from these gaps in the present example. It will be appreciated that, due to the proximity of such gaps to cutting blades (20), the leaking fluid may easily reach at least a portion of the interface between tool (2) and the workpiece. This will be particularly so considering the relatively high pressure of the fluid when it leaks, such that the fluid will tend to spray out from the gaps at a high velocity. Such spraying leakage may provide cooling and/or lubrication of the interface between tool (2) and the workpiece. Accordingly, the suitability for cooling and/or lubricating such interfaces may be considered during the selection of a fluid to be communicated through conduit (8) of tool (2).

Those of ordinary skill in the art will appreciate the speed with which tool (2) may be used to cut or ream multiple bores in a given time frame. For instance, the rotation of tool (2) may be kept substantially constant as tool (2) cuts or reams a plurality of bores. In other words, the rotation of tool (2) need not necessarily be stopped or re-started between bores. Furthermore, tool (2) may be used to cut or ream a bore in a single, one-dimensional linear movement along the axis of the bore. Thus, while tool (2) is disposed within the bore, the axis of tool (2) may remain aligned with the axis of the bore during the advancement and retraction of tool (2) through the bore. Other suitable methods for using tool (2) will be apparent to those of ordinary skill in the art.

It will also be apparent to those of ordinary skill in the art that while several embodiments of the invention have been disclosed in detail, numerous other modifications and improvements may be made thereon.

For example, those of ordinary skill in the art will recognize that it may not be necessary to use a pair of opposing cutting blades (20) at distal end (6). As an alternative, any other number of cutting blades (20) may be used. In an alternate embodiment, distal end (6) has a single cutting blade (20) with an opposing support pad similar to the type described in U.S. Pat. No. 6,270,295. In another alternate embodiment, distal end (6) has a single cutting blade (20) with no opposing support pad. In yet another alternate embodiment, distal end (6) has three or more cutting blades (20). In one embodiment, where distal end (6) has more than one cutting blade (20), cutting blades (20) will be spaced apart equidistantly about circumference of tool (2). In addition, tool (2) may have more than two extremities (26), each having a respective cutting blade (20). Still other suitable cutting blade (20) configurations will be apparent to those of ordinary skill in the art.

Those of ordinary skill in the art will also appreciate that tool (2) need not have any cutting blades (20) at all. In an alternate embodiment, tool (2) has rollers electroplated with or otherwise coated in diamond grit or Cubic Boron Nitride grit positioned proximate to where cutting blades (20) would be. By way of example only, tool (2) may be fitted with rollers similar to those described in U.S. Pub. No. 2005/0217336, entitled "Method and Apparatus for Patterning of Bore Surfaces," published Oct. 6, 2005, the disclosure of which is incorporated by reference herein. In this embodiment, grit may be approximately 0.006" in size. Of course, any other size of grit or other protuberance may be used. Grit may be used to impinge a pressure on the surface of a bore wall at approximately 10,000 pounds per square inch. Of course, any other amount of pressure may be used.

In addition, or in the alternative, tool (2) may be configured similar to the tool disclosed in U.S. Non-Provisional application Ser. No. 10/654,328, entitled "Tool With Selectively Biased Member and Method for Forming A Non-Axis Symmetric Feature," filed on Sep. 3, 2003, the disclosure of which is incorporated by reference herein.

As an alternative to tool (2) having plate (40A) with recesses (50) opening outwardly, tool (2) may have a pair of symmetrical plates with recesses opening inwardly, such that the recesses face each other when the plates are positioned together in slot (30). In this or similar alternate embodiments, outward forces may be exerted upon extremities (26) by the plates, as the plates will be urged outwardly by the pressurized fluid.

It will also be appreciated that, while slot (30) and plate (40A) have been shown in the present example as being generally rectangular, slot and plate may be of any other shape. By way of example only, slot and plate may be generally square, cylindrical, or any other substantially uniform cross-sectional shape, such as circular, elliptical, ovular, or triangular. Alternatively, slot and plate may be conical, frustoconical, pyramid-shaped, or any other suitable shape. In one embodiment, slot (30) is generally of the same shape as plate (40A-40D).

While tool (2) has been discussed as being particularly suitable for cutting bores having a relatively high length-to-diameter ratio, it will be appreciated that tool (2) is also suitable for use with bores having a relatively small length-to-diameter ratio, or any other types of bores. In addition, while tool (2) has been discussed as being suitable for cutting or reaming bores, it will be appreciated that tool (2) is also suitable for a variety of other types of machining and other operations.

Figure 11A:
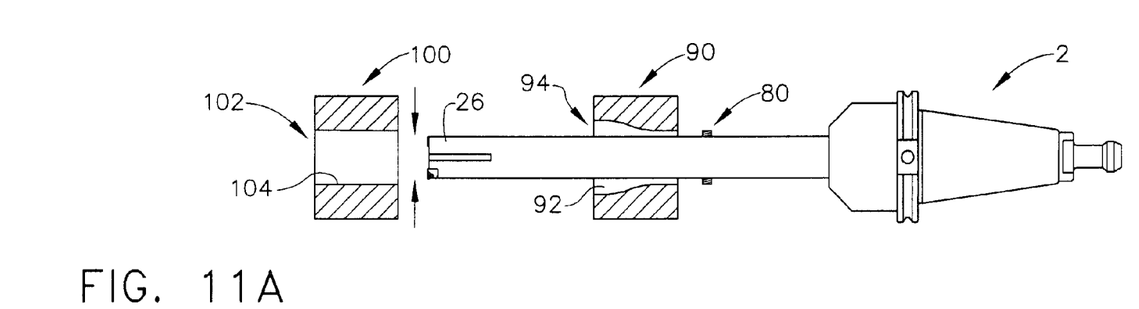
FIGS. 11A through 11F are series views of the tool of FIG. 1 and the cam of FIG. 10 in an exemplary use.
Figure 11B:
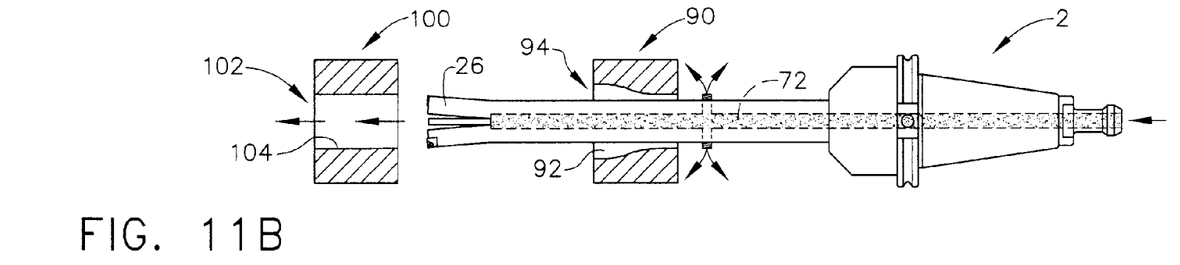

The following merely illustrative example, portions of which are shown in FIGS. 11A through 11F, outlines a method by which tool (2) and cam (90) may be used to produce a shaped bore (102) in a workpiece (100). First, as shown in FIG. 11A, bore (102) of workpiece (100), opening (94) of cam (90), and tool (2) are all aligned along a common axis. Rotation of tool (2) is initiated by a spindle at a machining station (not shown). Tool (2) is already predisposed within opening (94) of cam (90). Next, as shown in FIG. 11B, the pressure of fluid (72) being communicated to tool (2) (and hence, through tool (2)) is increased. Some, but not all, of the pressurized fluid is expelled through vents (80). The pressure of fluid in conduit (8) downstream of vents (80) is at a level sufficient to cause extremities (26) to bend outward until cutting blades (20) are separated at a desired diametric distance.

Figure 11C:
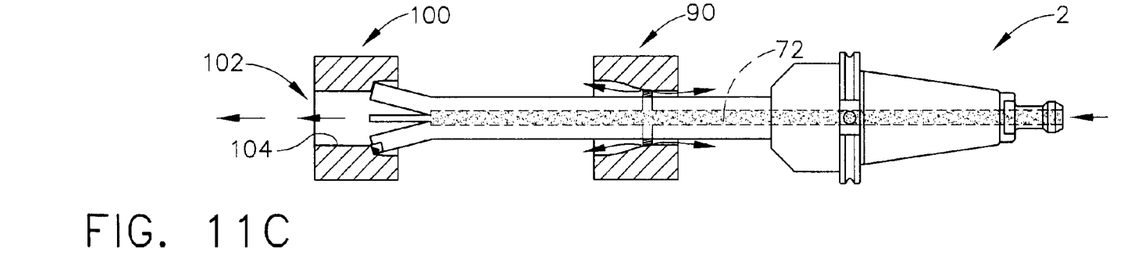

Then, as shown in FIG. 11C, as rotating tool (2) is linearly advanced along the axis of bore (74), vents (80) pass through opening (94) of cam (90), which provides resistance to fluid expelled through vents (80). This resistance causes an increase in the pressure of the fluid in conduit (8) downstream of vents (80), which results in an increase in the distance between cutting blades (20). As rotating tool (2) continues to be linearly advanced along the common axis, the resistance by cam (90) to fluid expelled through vents (80) varies, resulting in correspondingly varying separation between cutting blades (20). It will be appreciated that, during these stages of advancement, cutting blades (20) of tool (2) will engage with interior surface (104) of bore (102) in a cutting or reaming fashion.

Figure 11D:
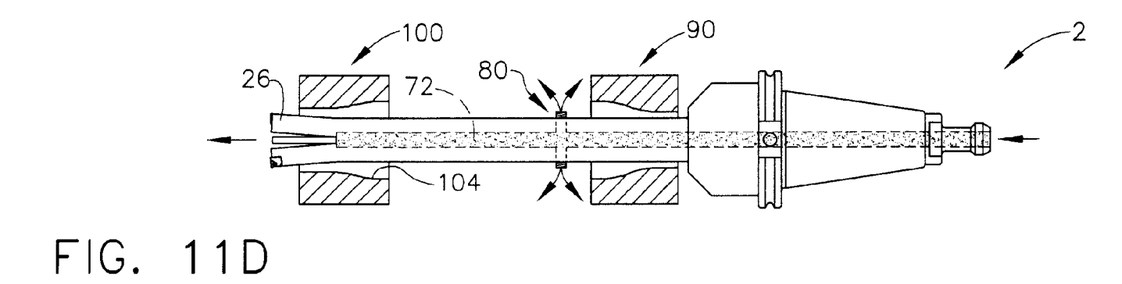
Figure 11E:
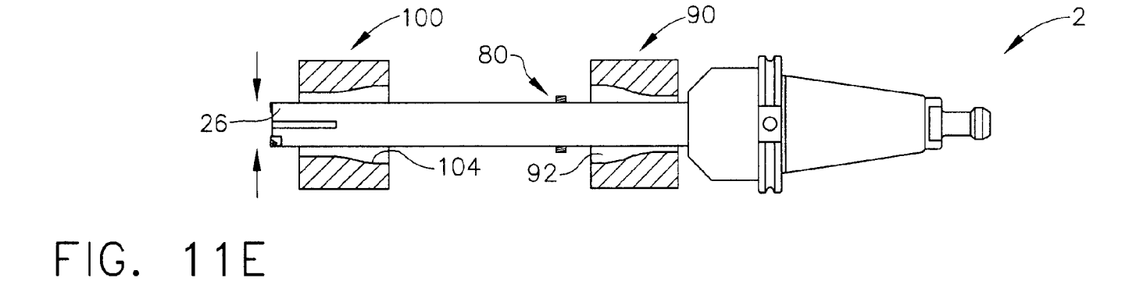

As shown in FIG. 11D, when vents (80) have passed through and cleared opening (94) of cam (90), cutting blades (80) will return to the separation they had before vents (80) reached opening (94) of cam (90). When tool (2) has been advanced into bore (102) to the desired length (e.g., such that cutting blades (20) have passed completely through bore (102) or to its desired end), fluid pressure in tool (2) may then be reduced, as shown in FIG. 11E, such as at the source of pressurized fluid (e.g., using a pump or valve). This reduction in fluid pressure will proportionally reduce the magnitude of the radially outward forces immediately being exerted against side surfaces (36) of slot (30) by fluid (72) being deflected by respective recesses (50) in plate (40A) (or by wafer (58), as the case may be). This reduction of force will permit the resilience of the material comprising distal end (6) of tool (2) to cause extremities (26) to return back radially inward, thereby decreasing the diametric distance between cutting blades (20). This decrease in the diametric distance between cutting blades (20) will nearly instantaneously cause disengagement of cutting blades (20) with bore wall (76), to the extent that such disengagement has not already occurred.

Figure 11F:
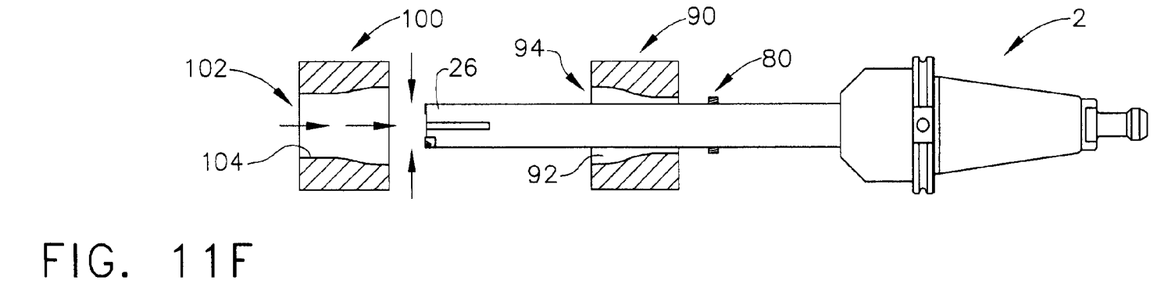

As shown in FIG. 11F, tool (2) may then be linearly withdrawn from bore (102) along the common axis. Tool (2), while still rotating, may then be moved to the next bore (102) for a similar process. Another cam (80) may be provided, fixed relative to such next bore (102). Alternatively, in embodiments where cam (80) is secured relative to tool (2) or is otherwise movable with tool (2), cam (80) may also be moved with tool (2) to another bore (102) for a similar process. In yet another embodiment, a workpiece (100) may be moved to align the axis of the next bore (102) with the axis of tool (2) before the process is repeated.

In one exemplary use, tool (2) is used with cam (90) to create a wrist pin hole in a diesel piston. It will be appreciated that tool (2) (e.g., with or without cam (90)) may be used to create bores or may be used to ream or shape existing bores. Other suitable uses will be apparent to those of ordinary skill in the art. It will also be appreciated that tool (2) and cam (90) may be used on workpieces (100) of any suitable material, including but not limited to stainless steel, aluminum, titanium, etc., and combinations thereof.

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to illustrate the principles of the invention and its practical application to thereby enable one of ordinary skill in the art to utilize the invention in various embodiments and with various modifications as are suited to the particular use contemplated. Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A tool for working a workpiece, the tool comprising:
an elongate member comprising:
   (i) a central axis defining axial, angular, and radial directions,
   (ii) first and second ends,
   (iii) at least two extremities located at the first end, at least one of the at least two extremities comprising at least one blade member, wherein the at least two extremities are operable to separate in response to a pressurized medium,
   (iv) a conduit, wherein the conduit is in fluid communication with the extremities, and
   (v) a pair of vents in fluid communication with the conduit, wherein the vents are operable to expel fluid communicated through the conduit, wherein a first portion of the conduit is proximal of the pair of vents, wherein a second portion of the conduit is distal of the pair of vents; and
(b) a cam member comprising an inner surface defining an opening, wherein the opening is configured to receive at least a portion of the elongate member, wherein the inner surface of the cam member has a generally tapered profile.

2. A method of producing a shaped bore, the method comprising:
   (a) providing an elongate cylindraceous member, wherein the elongate cylindraceous member comprises:
      (i) first and second ends positioned on an axis, the second end being configured to couple with a rotary actuation device,
      (ii) a conduit having a length,
      (iii) one or more cutting members located proximate to the first end, each of the one or more cutting members being positioned at a respective first distance from said axis, and
      (iv) two or more vents extending outward from the conduit, wherein each of the two or more vents is configured to expel a portion of fluid communicated through the conduit, wherein at least two of the two or more vents are located at different angular positions about the axis but at a common longitudinal position relative to the axis;
   (b) providing a cam, wherein the cam has an interior surface defining an opening;
   (c) inserting at least a portion of the elongate cylindraceous member through the opening of the cam;
   (d) rotating the elongate cylindraceous member;
   (e) communicating a pressurized fluid through the conduit;
   (f) advancing the elongate cylindraceous member toward a workpiece;
   (g) varying the pressure of the pressurized fluid in the conduit along a portion of the length of the conduit, wherein the act of varying the pressure comprises expelling a portion of the pressurized fluid through the at least two of the two or more vents against the interior surface of the cam; and
   (h) engaging the one or more cutting members with the workpiece, wherein the act of engaging comprises advancing at least a portion of the elongate cylindraceous member into or against the workpiece.

3. The method of claim 2, wherein the act of engaging the one or more cutting members with the workpiece produces a bore having a non-cylindrical profile.

4. The tool of claim 1, wherein the vents are longitudinally positioned between the at least one blade member and the second end.

5. The tool of claim 1, wherein each vent comprises a cannulated set screw.

6. The tool of claim 5, wherein a portion of each of the cannulated set screws extends radially outward from the elongate member.

7. The tool of claim 1, wherein the cam member is positioned along the central axis.

8. The tool of claim 1, wherein the inner surface of the cam member is configured to resist expulsion of fluid from the vents.

9. The tool of claim 8, wherein the inner surface of the cam member is further configured such that the resistance to expulsion of the fluid from the vents varies as a function of longitudinal position along the inner surface.

10. The tool of claim 8, wherein the elongate member is configured such that the pressure of fluid in the second portion of the conduit varies as a function of the resistance to expulsion of the fluid from the vents by the inner surface of the cam member.

11. The tool of claim 10, wherein the elongate member is configured such that the radial distance of the at least one blade member relative to the axis of the elongate member varies as a function of the pressure of fluid in the second portion of the conduit.

12. The tool of claim 11, wherein the elongate member is configured such that the radial distance of the at least one blade member relative to the axis of the elongate member varies as a function of the pressure of fluid in the second portion of the conduit when the pressure of fluid in the first portion of the conduit is substantially constant.

13. A tool, comprising:
  (a) an elongate cylindraceous member, the cylindraceous member comprising:
    (i) first and second ends positioned on a tool axis, the second end being configured to couple with a rotary actuation device,
    (ii) a conduit in fluid communication with the second end and the first end,
    (iii) one or more cutting members located proximate to the first end, each of the one or more cutting members being positioned at a respective first distance from said tool axis, and
    (iv) one or more vents extending outward from the conduit, wherein each of the one more vents is configured to expel a portion of fluid communicated through the conduit; and
  (b) a cam positioned along the tool axis, wherein the elongate cylindraceous member is moveable in the axial direction relative to the cam, wherein the cam is configured to resist expulsion of fluid expelled through the vents when the vents are positioned within the cam, wherein the cam has a length and defines an inner diameter, wherein a portion of the elongate cylindraceous member is disposed within the inner diameter of the cam, wherein the inner diameter of the cam varies along the length of the cam.

14. The tool of claim 13, further comprising two or more extremities, wherein the one or more cutting members are positioned on at least one of the two or more extremities.

15. The tool of claim 14, wherein at least a portion of each of the two or more extremities is configured to move radially outward in response to pressurized fluid communicated through the conduit.

16. The tool of claim 15, wherein the cylindraceous member and the cam are each configured such that the pressure of fluid within the conduit is variable as a function of resistance to expulsion of fluid expelled through the vents by the cam.

17. The tool of claim 16, wherein the cam has an interior surface defining an opening and a length, wherein the radial distance between the cylindraceous member and the opening is not constant along the length of the cam.

18. The method of claim 3, wherein the opening of the cam has a profile that is generally inverse relative to the profile of the bore.

* * * * *